United States Patent [19]

Hosoi et al.

[11] Patent Number: 5,702,794
[45] Date of Patent: Dec. 30, 1997

[54] LAMINATED POLYESTER FILM FOR MAGNETIC RECORDING MEDIUM

[75] Inventors: Masahiro Hosoi, Tokyo; Yasuhiko Saito, Matsuyama; Yasuhiro Saeki, Sagamihara; Masami Etchu, Yokohama, all of Japan

[73] Assignee: Teijin Limited, Osaka, Japan

[21] Appl. No.: 551,252

[22] Filed: Oct. 31, 1995

Related U.S. Application Data

[63] Continuation of Ser. No. 166,830, Dec. 15, 1993, abandoned.

[30] Foreign Application Priority Data

Dec. 17, 1992 [JP] Japan .................................. 4-337169

[51] Int. Cl.$^6$ .................. B32B 27/08; B32B 27/30; B32B 27/36; B32B 27/40
[52] U.S. Cl. .................. 428/65.3; 428/64.2; 428/216; 428/336; 428/339; 428/480; 428/483; 428/694 B; 428/694 BU; 428/694 SL; 428/910
[58] Field of Search .................. 428/141, 323, 428/480, 483, 910, 900, 694 ST, 694 SL, 694 SG, 213, 215, 216, 219, 220, 64.1, 64.2, 65.2, 65.4, 65.3, 65.8, 332, 334, 335, 336, 337, 339, 694 B, 694 BU

[56] References Cited

U.S. PATENT DOCUMENTS

| | | | |
|---|---|---|---|
| 3,875,119 | 4/1975 | Aoki et al. | 260/75 T |
| 3,935,166 | 1/1976 | Kanai et al. | 528/190 |
| 3,937,754 | 2/1976 | Shimotsuma et al. | 260/860 |
| 4,619,869 | 10/1986 | Kiriyama et al. | 428/480 |
| 4,687,700 | 8/1987 | Hensel et al. | 428/213 |
| 4,761,327 | 8/1988 | Hamano et al. | 428/220 |
| 4,798,759 | 1/1989 | Dallman et al. | 428/220 |
| 4,804,736 | 2/1989 | Utsumi | 528/176 |
| 4,876,137 | 10/1989 | Utsumi | 428/141 |
| 4,952,449 | 8/1990 | Okazaki et al. | 428/147 |
| 5,051,292 | 9/1991 | Katoh et al. | 428/141 |
| 5,069,902 | 12/1991 | Okazaki et al. | 428/323 |

FOREIGN PATENT DOCUMENTS

| | | |
|---|---|---|
| 0504651 | 9/1992 | European Pat. Off. |
| 0510893 | 10/1992 | European Pat. Off. |
| 61-091247 | 5/1986 | Japan . |
| 4-028527 | 1/1992 | Japan . |

*Primary Examiner*—Paul J. Thibodeau
*Assistant Examiner*—Vivian Chen
*Attorney, Agent, or Firm*—Sherman and Shalloway

[57] ABSTRACT

A magnetic recording tape or disk formed from a biaxially oriented laminated polyester base film which comprises a layer (A) of a polyester consisting essentially of 2,6-naphthalenedicarboxylic acid and ethylene glycol components and a layer (B) of a copolyester consisting essentially of 2,6-naphthalenedicarboxylic acid, ethylene glycol, and diethylene glycol components, wherein the copolyester contains 1–5% by weight of the diethylene glycol component, based on the weight of the layer (B) copolyester, layer (B) being present on one or both surfaces of layer (A).

23 Claims, No Drawings

LAMINATED POLYESTER FILM FOR MAGNETIC RECORDING MEDIUM

This application is a continuation of application Ser. No. 08/166,830, filed Dec. 15, 1993, abandoned.

BACKGROUND OF THE INVENTION

1. Field of the Invention

The present invention relates to a laminated polyester film for a magnetic recording medium, more specifically to a laminated polyester film for use as a base film for a high-density magnetic recording medium, e.g., a base film for a metal tape or a flexible disk.

2. Prior Art

A biaxially oriented polyethylene terephthalate film has been hitherto known as a base film for a magnetic recording tape. A magnetic recording tape formed of such a base film has a low coercive force. It is therefore necessary to decrease the tape thickness in order to make it possible to encase a longer tape in a cassette for recording of longer duration. However, when the tape thickness is decreased, there is a problem in that the running properties and durability of the tape deteriorate.

There are therefore a number of proposals for use of a biaxially oriented polyethylene-2,6-naphthalenedicarboxylate film having a high Young's modulus as a base film for a magnetic recording tape.

However, even if a magnetic recording tape is produced from the above polyethylene-2,6-naphthalenedicarboxylate film having a high Young's modulus and a low heat shrinkage, several problems occur when the thickness of the base film is decreased in order to achieve the long recording and reproduction and the Young's modulus of the base film is made higher by increasing molecular orientation through drawing.

That is, with an increase in the degree of orientation, voids are liable to be formed interfaces between inert fine particles contained as a lubricant and a polymer. At the same time, the lubricant is liable to drop off from the film surface to cause dust (foreign matter). The foreign matter may adhere to the film surface or may be caught in a coated web or a tape in the step of forming a magnetic recording tape to affect the electromagnetic conversion characteristics.

It is increasingly desired to overcome the above problem as the recording density increases.

SUMMARY OF THE INVENTION

It is an object of the present invention to provide a polyester film useful as a base film for a high-density magnetic recording medium.

It is another object of the present invention to provide a polyester film useful as a base film for a high-density magnetic recording tape or flexible disc.

It is further another object of the present invention to provide a polyester film which can give a high-density magnetic recording tape almost free from deterioration of running properties and durability as well as electromagnetic conversion characteristics when used as a base film which has a decreased thickness.

It is further another object of the present invention to provide an oriented polyester film, use of which as a base film permits to substantially prevent abrasion caused by a die coater and a calender treatment in producing a magnetic recording medium.

According to the present invention, the above objects and advantages of the present invention will be achieved by a laminated polyester film for a magnetic recording medium, which comprises a layer (A) of a polyester consisting essentially of a recurring unit of ethylene-2,6-naphthalenedicarboxylate and layer(s) (B) of a copolyester composed mainly of a recurring unit of ethylene-2,6-naphthalenedicarboxylate, the copolyester(s) containing 1 to 5% by weight of diethylene glycol component as the copolyester unit, the layer (A) being provided with the layer(s) (B) on one surface or both surfaces thereof, the laminated polyester film being biaxially oriented.

The present invention will be detailed hereinafter.

DETAILED DESCRIPTION OF THE INVENTION

The laminated polyester film of the present invention comprises a layer (A) of a polyester consisting essentially of a recurring unit of ethylene-2,6-naphthalenedicarboxylate and layer(s) (B) of a copolyester composed mainly of a recurring unit of ethylene-2,6-naphthalenedicarboxylate.

The above polyester forming the layer (A) consists essentially of a recurring unit of ethylene-2,6-naphthalenedicarboxylate as described above, while this polyester may contain diethylene glycol and/or other third component as the polyester unit in a total amount of less than 1% by weight, based on the polyester.

The above copolyester forming the layer(s)(B) is composed mainly of ethylene-2,6-naphthalenedicarboxylate, and further contains, based on the copolyester, 1 to 5% by weight, preferably 2 to 5% by weight, of diethylene glycol as the copolyester unit. Further, this copolyester may contain third component(s) as the copolyester unit in a total amount of less than 1% by weight.

Examples of the above third component(s) for forming the polyester and the copolyester include aromatic dicarboxylic acids such as terephthalic acid, isophthalic acid, diphenylsulfonedicarboxylic acid, 4,4'-diphenyldicarboxylic acid and benzophenonedicarboxylic acid; aliphatic dicarboxylic acids such as succinic acid, adipic acid, sebacic acid and dodecanedicarboxylic acid; alicyclic dicarboxylic acids such as hexahydroterephthalic acid and 1,3-adamantanedicarboxylic acid; 1,3-propanediol, 1,4-butanediol, 1,6-hexanediol, neopentyl glycol, 1,4-cyclohexanedimethanol, ethylene oxide adduct of bisphenol A, and p-xylylene glycol.

When the amount of diethylene glycol component or third component as the polyester or copolyester unit is calculated, glycol or diol component is defined as the residue which is formed by deleting two hydrogen atoms from two hydroxyl groups of the glycol or diol, and dicarboxylic acid component is defined as the residue which is formed by deleting two hydroxyl groups from the dicarboxylic acid.

The polyester forming the layer (A) and the copolyester forming the layer (B) may contain additives such as a stabilizer, a colorant and an antistatic agent. For improving the slipperiness of the film, the polyester and the co-polyester may preferably contain, as lubricants, a variety of inert solid fine particles to roughen the film surface.

Examples of the above solid fine particles preferably include (1) silicon dioxide and its hydrate, diatomaceous earth, siliceous sand and quartz; (2) alumina; (3) silicates containing at least 30% by weight of an $SiO_2$ component such as amorphous or crystalline clay minerals, aluminosilicate, calcined products thereof, hydrates thereof, chrysotile, zircon and fly ash; (4) oxides of Mg, Zn, Zr and Ti; (5) sulfides of Ca and Ba, (6) phosphates of Ni, Na and Ca, monohydrates thereof and dihydrates thereof; (7) benzoates of Li, Na and K; (8) terephthalates of Ca, Ba, Zn and Mn; (9) titanates of Mg, Ca, Ba, Zn, Cd, Pb, Sr, Mn, Fe, Co and Ni; (10) chromates of Ba and Pb; (11) carbon such as carbon black and graphite; (12) glass such as glass powders and glass beads; (13) carbonates of Ca and Mg; (14) fluorite; (15) ZnS and (16) fine particles of heat resistant polymer such as silicon resin, crosslinked acrylic resin, crosslinked polystyrene resin, crosslinked polyester resin, fluorine-containing resin and polyimide resin. Further preferred are silicon dioxide, anhydrous silicic acid, hydrous silicic acid, aluminum oxide, aluminum silicate, calcined products and hydrates thereof, monolithium phosphate, trilithium phosphate, sodium phosphate, calcium phosphate, barium sulfate, titanium oxide, lithium benzoate, double salts and hydrates of these compounds, glass powders, clays such as kaolin, bentonite and terra abla, talc, diatomaceous earth and calcium carbonate. Particularly preferred are silicon dioxide, titanium oxide and calcium carbonate.

The average particle diameter of the above inert solid fine particles is preferably 0.02 to 0.6 μm, and the amount thereof is preferably 0.01 to 0.5% by weight.

The polyester and the copolyester used in this invention can be produced by a method known per se.

For example, the polyester to form the layer (A) can be produced by mixing predetermined amounts of 2,6-naphthalenedicarboxylic acid and ethylene glycol, directly esterifying the resultant mixture under atmospheric pressure or elevated pressure and further subjecting the resultant electrification product to melt-polycondensation under reduced pressure.

The copolyester to form the layer (B) can be produced in the same manner as above except that diethylene glycol is further used in a predetermined amount. For producing the polyester or the copolyester according the above method, a catalyst and an additive may be used as required.

The intrinsic viscosity of the polyester and the copolyester, as measured in o-chlorophenol at 25° C., is preferably 0.45 to 0.90 dl/g.

In the laminated polyester film of the present invention, the layer (A) of the polyester is provided with the layer (s)(B) on one surface or both surfaces of the layer (A). Therefore, the laminated polyester film of the present invention can have any one of a two-layered structure and a three-layered structure. When the laminated polyester film has a three-layered structure, the central layer is of the layer (A). The laminated polyester film is biaxially oriented.

In the laminated polyester film, the thickness of each layer may be determined freely, while the laminated polyester film excellently functions when the layer(s) (B) has a proper thickness. For example, when the laminated polyester film is used as a base film for a magnetic recording tape, the film thickness is preferably 3 to 12 μm and the thickness of the layer (B) is preferably at least 0.1 μm and ⅓ or less of the film thickness.

When the laminated polyester film is used as a base film for a magnetic recording flexible disk, the film thickness is preferably 30 to 80 μm and the thickness of the layer (B) is preferably 0.2 to 10 μm, more preferably 0.2 to 5 μm.

For using the laminated polyester film as a base film for a magnetic recording tape, the Young's moduli of the laminated polyester film both in the machine and transverse directions are preferably at least 500 kg/mm². More preferably, the Young's modulus in one direction is at least 500 kg/mm² and the Young's modulus in the other direction is at least 550 kg/mm², and particularly preferably the Young's modulus in one direction is at least 550 kg/mm² and the Young's modulus in the other direction is at least 650 kg/mm². For using the laminated polyester film as a base film for a magnetic recording flexible disk, the Young's moduli both in the machine and transverse directions are preferably at least 500 kg/mm², more preferably at least 550 kg/mm², particularly preferably at least 600 kg/mm².

The laminated polyester film of the present invention can be produced by a laminated film production method known per se. Particularly preferred is a method in which the polyester to form the layer (A) and the copolyester to form the layer(s)(B) are melt-coextruded to prepare an unstretched laminated film and this film is biaxially oriented.

For producing the unstretched laminated polyester film by a melt-coextrusion method, the polyester and the copolyester are separately melted in different extruders, the molten resins are brought into contact just before an extrusion die or within an extrusion die, and the resultant laminate is cooled. When the molten resins are brought into contact just before an extrusion die, a feed block can be used as a device for contacting the molten resins. When the molten resins are brought into contact within an extrusion die, a stock plate die or a multimanifold die can be used as the extrusion die.

The biaxial orientation can be carried out by a consecutive biaxial orientation method or by a simultaneous biaxial orientation method, while the former consecutive biaxial orientation method is preferred. Further, a three-stage orientation method or a four-stage orientation method may be employed.

When the biaxial orientation is carried out by the consecutive biaxial orientation method, the orientation at a first stage is carried out at a temperature higher than the glass transition temperature (Tg) of the polyester forming the layer (A), preferably between (Tg+3) and (Tg+50)°C., and the orientation at a second stage is carried out at a temperature between the same temperature as that employed at the first stage and a temperature which is higher than the same temperature employed that employed at the first stage by 20° C. The stretch ratio is preferably at least 2, more preferably at least 2.5, in a monoaxial direction, and the area stretch ratio is preferably at least 6, more preferably at least 8. The heat treatment (heatset) is carried out preferably at 170° C. or higher, more preferably at 190° C. or higher, under tension. Although differing depending upon how long the heat treatment is carried out, the upper limit of the heat treatment temperature naturally refers to a temperature at which the film has a stable form. The heat treatment is carried out preferably for several seconds to tens of seconds, more preferably for 3 seconds to 30 seconds.

For producing the laminated polyester film having high strength (high Young's modulus), it is preferred to employ a so-called three-stage or four-stage orientation method in which the above unstretched film is first stretched 2.0 to 3.0 times in the machine direction at a temperature between 130° and 170° C., the so-stretched film is stretched 3.5 to 4.5 times in the transverse direction at a temperature between 130° and 160° C., and then the resultant film is stretched 1.5 to 2.5 times in the machine direction and/or in the transverse direction at a temperature between 130° and 170° C.

A magnetic layer is formed on one surface or both surfaces of the laminated polyester film of the present invention, whereby a magnetic recording medium is obtained.

A magnetic layer and a method of forming the magnetic layer one surface or each of the surfaces of a base film are known, and such a known magnetic layer and a known method may be employed in the present invention.

For example, a magnetic layer is formed by applying a magnetic coating composition to a base film. In this case, the ferromagnetic powder for forming the magnetic layer is selected from known ferromagnetic materials such as γ-$Fe_2O_3$, Co-containing γ-$Fe_2O_3$, Co-containing γ-$Fe_3O_4$, $CrO_2$ and barium ferrite.

The binder used with the magnetic powder is selected from known thermoplastic resins, thermosetting resins, reactive resins and mixtures of these. Specific examples of these resins include a vinyl chloride-vinyl acetate copolymer and polyurethane elastomer.

The magnetic coating composition may further contain an abradant (e.g., α-$Al_2O_3$), an electrically conductive agent (e.g., carbon black), a dispersant (e.g., lecithin), a lubricant (e.g., n-butyl stearate and lecithin), a curing agent (e.g., epoxy resin) and a solvent (e.g., methyl ethyl ketone, methyl isobutyl ketone and toluene).

A magnetic layer may be also formed by a wet method such as electroless plating or electrolytic plating or a dry method such as vacuum vapor deposition, sputtering or ion plating.

When a magnetic layer is formed only on one surface of the base film, the other surface of the base film may be coated with an organic polymer to maintain the running properties as a tape.

The present invention will be explained more in detail hereinafter by reference to Examples.

The physical property values and characteristics described in Examples 1–6 and Comparative Examples 1–4 were measured and defined as follows.

(1) Young's modulus

A film was cut to prepare a sample having a width of 10 mm and a length of 150 mm, and the sample was strained with an Instron type universal tensile tester at an interchuck distance of 100 mm at a straining rate of 10 mm/minute at a chart feeding rate of 500 mm/minute to prepare a load-elongation curve. The Young's modulus was calculated on the basis of a tangent on the rising part of the load-elongation curve.

(2) Surface roughness (Ra) of film

A chart (surface roughness curve of a film) was drawn by means of a needle-contacting type surface roughness tester (Surfcoder 30C, supplied by Kosaka Laboratories) having a 2 μm radius needle under a needle pressure of 30 mg. A portion having a measured length L in the direction of its center line is picked up from the surface roughness curve of a film. The center line of this portion picked up was regarded as an X axis, the direction of the length multiplication was regarded as a Y axis, and the roughness curve was expressed as Y=f(x). The value (Ra: μm) given by the following equation was defined as the surface roughness of the film.

$$Ra = \frac{1}{L} \int_0^L |f(x)| dx$$

A film having a length of about 30 cm and a width of 1 cm, which had been accurately measured for a length, and was placed in an oven set at 105° C. under no load, and heat-treated for 60 minutes. Then, the film was taken out of the oven, allowed to cool to room temperature and measured for a difference in length between before the heat treatment and after the heat treatment. The heat shrinkage was determined on the basis of the following equation.

$$\text{Heat shrinkage (\%)} = \frac{\Delta L}{L_0} \times 100$$

wherein $L_0$ is a length before the heat treatment and $\Delta L$ is a difference in length.

(4) Abrasion

A film was slit to prepare a tape having a width of ½ inch, and the tape was allowed to run 50 m while one blade edge was vertically pressed to the tape so that the tape was pushed 1.5 mm apart from its normal running course (running tension: 60 g, running speed: 1 m/second). The abrasion was evaluated on the basis of the width of abrasion dust adhering to the one blade edge.

(5) Electromagnetic conversion characteristics

A magnetic video tape was measured for an S/N ratio with a noise meter supplied by Shibasoku K. K. Further, a difference between the above S/N ratio and the S/N ratio of a tape of Comparative Example 1 shown in Table 1 was calculated. As a VTR, EV-S700 supplied by Sony Corp. was used.

(6) Running durability of magnetic tape

While the running of a magnetic tape with a VTR (EV-S700, supplied by Sony Co. Ltd.) was started and stopped repeatedly for 100 hours, the magnetic tape was examined on its running state and measured for output. A magnetic tape which satisfied all of the following items was taken as excellent, and a magnetic tape which failed to satisfy any one of the items was taken as poor.

(i): A tape edge did not bend and a tape did not become a wavy shape.

(ii): A tape did not squeak in running.

(iii): A tape underwent neither tearing nor breaking.

(7) Skew

A video tape which was used for recording at an ordinary temperature (20° C.) at an ordinary humidity (60% RH) was heat-treated at 70° C. for 1 hour, and while the video tape was played back at an ordinary temperature at an ordinary humidity, a deviation amount was read at a head switching point.

(8) Drop-out

Drop-outs of 5 μsec×10 dB were counted with a commercially available drop-out counter (e.g., VH01BZ, supplied by Shibasoku K. K.) to determine the number of counts per minute.

(9) Void area ratio

The surface of a film was ion-etched to expose fine particles in the film, and aluminum was uniformly vapor-deposited thereon in a thickness of 400 to 500 angstroms or less. Then, while the film surface was observed with a scanning electron microscope at a magnification of 3,500 to 5,000, voids around fine particles were measured for areas with an image analyzing apparatus Luzex 500 supplied by Nihon Regulator Co., Ltd. Further, the fine particles were similarly measured for areas, and the void area ratio was determined by dividing the areas of the voids by the areas of the fine particles.

The above ion-etching was carried out with a JFC-1100 ion-sputtering apparatus supplied by NEC Corp. at 500 V at 12.5 mA for 15 minutes. The vacuum degree was about $10^{-3}$ Torr. The particles measured had a size of about 0.3 μm or greater.

(10) Amount of oligomer extract

A film (38 mm×38 mm) was immersed in 20 cc of chloroform at 25° C. for 1 hour, and the film was taken out. Then, the chloroform solution containing a remaining oligomer extract was measured for absorbance at a wavelength of 240 nm, and the oligomer amount was determined on the basis of the absorbance by reference to a preliminarily prepared calibration curve showing the relationship between the oligomer concentration and the absorbance.

The above absorbance was measured with a self-recording spectrophotometer HV-VIS-NIR supplied by Shimadzu Corporation.

EXAMPLE 1

An ethylene-2,6-naphthalenedicarboxylate homopolymer containing 0.2% by weight of silica fine particles having an average particle diameter of 0.1 μm was prepared according to a conventional method. The homopolymer had an intrinsic viscosity of 0.63 dl/g.

Further, an ethylene-2,6-naphthalenedicarboxylate copolymer having diethylene glycol (DEG) component as the copolymer unit in an amount shown in Table 1, containing 0.3% by weight of silica fine particles having an average particle diameter of 0.1 μm and 0.02% by weight of calcium carbonate having an average particle diameter of 0.6 μm, was prepared according to a conventional method. The copolymer had an intrinsic viscosity of 0.68 dl/g.

The above homopolymer and the copolymer were separately dried and then melted in different melt-extruder, and these two polymers were allowed to come in contact in a bilayer-structured extrusion die, extruded and cooled to obtain a laminated unstretched film.

The above-obtained unstretched film was stretched 3.1 times in the machine direction at 130° C. through two rolls having a velocity difference, further stretched 5.35 times in the transverse direction at 130° C. with a tenter, and then heat-treated at 215° C. for 10 seconds to give a biaxially oriented laminated polyester film having a thickness of 5.8 μm.

The above biaxially oriented laminated polyester film was taken up. Table 1 shows the properties thereof.

Separately, the following composition was placed in a ball mill and kneaded/dispersed for 16 hours, and 5 parts by weight of an isocyanate compound (Desmodur L, supplied by Bayer AG) was added. The mixture was dispersed for one hour under shear force at a high velocity to prepare a magnetic coating composition.

| Magnetic coating composition: | |
|---|---|
| | (Part by weight) |
| Acicular Fe particles | 100 |
| Vinyl chloride-vinyl acetate copolymer (Eslec 7A, supplied by Sekisui Chemical Co., Ltd.) | 15 |
| Thermoplastic polyurethane | 5 |
| Chromium oxide | 5 |
| Carbon black | 5 |
| Lecithin | 2 |
| Fatty acid ester | 1 |
| Toluene | 50 |

| Magnetic coating composition: | |
|---|---|
| | (Part by weight) |
| Methyl ethyl ketone | 50 |
| Cyclohexanone | 50 |

The above-obtained magnetic coating composition was applied to the homopolymer surface of the above biaxially oriented polyester film so that the coating had a thickness of 3 μm. Then, the film was subjected to orientation treatment in a direct-current magnetic field at 2,500 gauss, dried under heat at 100° C., treated with a super calender (linear pressure 200 kg/cm, temperature 80° C.), and taken up. The so-obtained roll was allowed to stand in an oven at 55° C. for 3 days.

Further, the following back coating composition was applied to the surface (running surface) of the copolymer of the above biaxially oriented laminated polyester film so that the back coatings had a thickness of 1 μm, and dried. Further, the film was cut to prepare a tape having a width of 8 mm, whereby a magnetic tape was obtained.

| Back coating composition: | |
|---|---|
| | (Part by weight) |
| Carbon black | 100 |
| Thermoplastic polyurethane | 60 |
| Isocyanate compound (Coronate L supplied by Nippon Polyurethane Industries, Ltd.) | 18 |
| Silicone oil | 0.5 |
| Methyl ethyl ketone | 250 |
| Toluene | 50 |

Table 1 shows the properties of the above-obtained film.

EXAMPLES 2-5 AND COMPARATIVE EXAMPLES 1-2

Example 1 was repeated except that the amount of diethylene glycol component as the copolymer unit was changed as shown in Table 1. Table 1 shows the properties of the so-obtained films.

As shown in Table 1, the tapes obtained from the films prepared in Examples were excellent in freedom from drop-out, electromagnetic conversion, running durability and skew.

In the column of "Film structure" in Table 1, the "homopolymer" refers to ethylene-2,6-naphthalenedicarboxylate homopolymer, and the "copolymer" refers to the ethylene-2,6-naphthalenedicarboxylate copolymer having diethylene glycol (DEG) component as the copolymer unit.

TABLE 1

| Film Structure | | Thickness (μm) | Surface Roughness Ra (μm) | Young's modulus MD/TD (kg/mm$^2$) | Heat shrinkage (%) | Amount oligomer extract (mg/m$^2$ · hr) | Width of abrasion dust (mm) |
|---|---|---|---|---|---|---|---|
| | Layer Polymer | | | | | | |
| CEx. 1 | (A) homopolymer | 5.6 | 5 | 550/1,250 | 0.02/0.07 | 5 | 1.0 |
| | (B) copolymer (DEG 0.50 wt %) | 0.2 | 6 | | | | |
| Ex. 1 | (A) homopolymer | 5.6 | 5 | 550/1,250 | 0.02/0.07 | 5 | 0.9 |
| | (B) copolymer (DEG 1 wt %) | 0.2 | 6 | | | | |

TABLE 1-continued

| | | | | | | | | |
|---|---|---|---|---|---|---|---|---|
| Ex. 2 | (A) | homopolymer | 5.6 | 5 | 550/1,250 | 0.02/0.07 | 6 | 0.7 |
| | (B) | copolymer (DEG 2 wt %) | 0.2 | 6 | | | | |
| Ex. 3 | (A) | homopolymer | 5.6 | 5 | 545/1,240 | 0.02/0.07 | 11 | 0.5 |
| | (B) | copolymer (DEG 5 wt %) | 0.2 | 5 | | | | |
| CEx. 2 | (A) | homopolymer | 5.6 | 5 | 545/1,240 | 0.02/0.07 | 18 | 0.3 |
| | (B) | copolymer (DEG 6 wt %) | 0.2 | 5 | | | | |
| Ex. 4 | (A) | homopolymer | 5.0 | 5 | 540/1,240 | 0.02/0.07 | 8 | 0.6 |
| | (B) | copolymer (DEG 3 wt %) | 0.8 | 5 | | | | |
| Ex. 5 | (A) | homopolymer | 4.8 | 5 | 530/1,230 | 0.02/0.08 | 9 | 0.6 |
| | (B) | copolymer (DEG 3 wt %) | 1.0 | 5 | | | | |

| | Electromagnetic conversion characteristics Y-S/N (dB) | Running durability | Skew ($\mu \cdot$ sec) | Drop-out (piece/min.) |
|---|---|---|---|---|
| CEx. 1 | −0.5 | excellent | 5 | 13 |
| Ex. 1 | +0.5 | excellent | 5 | 12 |
| Ex. 2 | +0.5 | excellent | 5 | 8 |
| Ex. 3 | 0 | excellent | 5 | 7 |
| CEx. 2 | −0.5 | excellent | 5 | 15 |
| Ex. 4 | 0 | excellent | 5 | 5 |
| Ex. 5 | 0 | good | 5 | 5 |

Ex. = Example,
CEx. = Comparative Example

EXAMPLE 6

An ethylene-2,6-naphthalenedicarboxylate homopolymer which substantially did not contain fine particles as a lubricant was prepared according to a conventional method. Further, an ethylene-2,6-naphthalenedicarboxylate copolymer having 3% by weight of diethylene glycol component as the copolymer unit, containing 0.3% by weight of silica fine particles having an average particle diameter of 0.1 μm and 0.015% by weight of calcium carbonate fine particles having an average particle diameter of 0.6 μm, was prepared according to a conventional method. These polymers had an intrinsic viscosity of 0.65 dl/g.

The above homopolymer and copolymer were separately dried and then melted in different melt-extruder, and these two polymers were allowed to come in contact in a three layer-structured extrusion die such that the homopolymer formed a central layer and that the copolymer formed two surface layers, extruded and rapidly cooled to obtain a laminated unstretched film.

The above-obtained unstretched film was stretched 3.6 times in the machine direction at 140° C., further stretched 3.7 times in the transverse direction at 150° C., and then heat-treated at 235° C. for 30 seconds to give a biaxially oriented laminated polyester film having a thickness of 62 μm.

The above biaxially oriented laminated film had a Young's modulus of 610 kg/mm² both in the machine and transverse directions, a surface layer thickness of 2 μm each and a central layer thickness 58 μm.

The two surface layers of the above-obtained laminated polyester film were formed of the copolymer and the void area ratio of voids formed around the silica and calcium carbonate fine particles in the surface layers was very small, as small as 1.01.

COMPARATIVE EXAMPLE 3

An ethylene-2,6-naphthalenedicarboxylate homopolymer containing 0.3% by weight of silica fine particles having an average particle diameter of 0.1 μm and 0.015% by weight of calcium carbonate fine particles having an average particle diameter of 0.6 μm was prepared according to a conventional method.

Then, a biaxially oriented laminated film was obtained in the same manner as in Example 6 except that the copolymer used in Example 6 was replaced with the above ethylene-2,6-naphthalenedicarboxylate homopolymer. The void area ratio of voids formed around the silica and calcium carbonate fine particles in the surface layers was as large as 1.15.

The films obtained in Example 6 and Comparative Example 3 were respectively slit to prepare samples having a width of 300 mm and a length of 2,000 m, and then taken up.

These samples were separately allowed to run about 2,000 m in contact with dust fabrics (nonwoven fabric for dust removal), and the dust fabrics were observed for white powder-like dust adhering thereto. As a result, the dust fabric used with the sample prepared in Example 6 had a clearly smaller amount of the adhering dust than the dust fabric used with the sample prepared obtained in Comparative Example 3, which showed that the surface of the film obtained in Example 6 was harder to abrade.

What is claimed is:

1. A magnetic recording medium comprising of a magnetic recording layer and a biaxially oriented laminated polyester base film wherein the base film comprises a layer (A) of a polyester consisting essentially of 2,6-naphthalenedicarboxylic acid and ethylene glycol components, and a layer (B) of a copolyester consisting essentially of 2,6-naphthalenedicarboxylic acid, ethylene glycol, and diethylene glycol components, the copolyester containing 1–5% by weight of the diethylene glycol component, based on the weight of the layer (B) copolyester, the layer (A) being provided with the layer (B) on one surface or both surfaces of layer (A).

2. A magnetic recording medium according to claim 1, wherein the magnetic layer comprises ferromagnetic particles in a vinyl acetate-vinyl chloride copolymer and polyurethane binder.

3. A magnetic recording tape comprising of a magnetic recording layer and a biaxially oriented laminated polyester base film wherein the base film comprises a layer (A) of a polyester consisting essentially of 2,6- naphthalenedicarboxylic acid and ethylene glycol components, and a layer (B) of a copolyester consisting essentially of 2,6-naphthalenedicarboxylic acid, ethylene glycol, and diethylene glycol components, the copolyester containing 1–5% by weight of the diethylene glycol component, based on the weight of the layer (B) copolyester, the layer (A) being provided with the layer (B) on one surface or both surfaces thereof, wherein the laminated polyester film has a total thickness of 3 to 12 μm and Young's moduli of at least 500 kg/mm² in both the machine and transverse directions.

4. A magnetic recording tape according to claim 3, wherein layer (B) has a thickness of 0.1 μm to one fifth of the total thickness of the laminated polyester film.

5. A magnetic recording tape according to claim 3, wherein said laminated polyester film has a Young's modulus in the machine direction of 530 to 550 and a Young's modulus in the transverse direction of 1230 to 1250 kg/mm².

6. A magnetic recording tape according to claim 3, wherein said laminated polyester film has a bilayer structure formed of the layer (A) and the layer (B).

7. A magnetic recording tape according to claim 3, wherein said laminated polyester film has a three-layer structure formed of one layer (A) and two layers (B), the layer (A) forming a central layer.

8. A magnetic recording tape according to claim 3, wherein the magnetic layer comprises ferromagnetic particles in a vinyl acetate-vinyl chloride copolymer and polyurethane binder.

9. A magnetic recording disk comprising of a magnetic recording layer and a biaxially oriented laminated polyester base fill wherein the base film comprises a layer (A) of a polyester consisting essentially of 2,6-naphthalenedicarboxylic acid and ethylene glycol components, and a layer (B) of a copolyester consisting essentially of 2,6-naphthalenedicarboxylic acid, ethylene glycol, and diethylene glycol components, the copolyester containing 1–5% by weight of the diethylene glycol component, based on the weight of the layer (B) copolyester, the layer (A) being provided with the layer (B) on one surface or both surfaces of the layer (A), wherein the laminated polyester film has a total thickness of 30 to 80 μm and Young's moduli of at least 500 kg/mm² in both the machine and transverse directions.

10. A magnetic recording disk according to claim 9, wherein layer (B) has a thickness of 0.2 to 10 μm.

11. A magnetic recording disk according to claim 9, wherein the laminated polyester film has a Young's modulus in the machine direction of 550 to 610 and a Young's modulus in the transverse direction of 550 to 650 kg/mm².

12. A magnetic recording disk according to claim 9, wherein the laminated polyester film has a bilayer structure formed of the layer (A) and the layer (B).

13. A magnetic recording disk according to claim 9, wherein the laminated polyester film has a three-layer structure formed of one layer (A) and two layers (B), the layer (A) forming a central layer.

14. A magnetic recording disk according to claim 9, wherein the magnetic layer comprises ferromagnetic particles in a vinyl acetate-vinyl chloride copolymer and polyurethane binder.

15. A magnetic recording medium comprising of a magnetic recording layer and a biaxially oriented laminated polyester base film wherein the base film comprises a layer (A) of a polyester consisting essentially of 2,6-naphthalenedicarboxylic acid and ethylene glycol components and a layer (B) of a copolyester consisting essentially of 2,6-naphthalenedicarboxylic acid, ethylene glycol and diethylene glycol components, the copolyester containing 1 to 2.0% by weight of the diethylene glycol component, based on the weight of the layer (B) copolyester, the layer (A) being provided with the layer (B) on one surface or both surfaces of layer (A).

16. A magnetic recording tape comprising of a magnetic recording layer and a biaxially oriented laminated polyester base film wherein the base film comprises a layer (A) of a polyester consisting essentially of 2,6-naphthalenedicarboxylic acid and ethylene glycol components and a layer (B) of a copolyester consisting essentially of 2,6-naphthalenedicarboxylic acid, ethylene glycol and diethylene glycol components, the copolyester containing 1 to 2.0% by weight of the diethylene glycol, based on the weight of the layer (B) copolyester, the layer (A) being provided with the layer (B) on one surface or both surfaces of layer (A), wherein the laminated polyester film has a total thickness of 3 to 12 μm and Young's moduli of at least 500 kg/mm² in both the machine and transverse directions.

17. A magnetic recording tape according to claim 16, wherein the laminated polyester film has a bilayer structure formed of the layer (A) and the layer (B).

18. A magnetic recording tape according to claim 16, wherein the laminated polyester film has a three-layer structure formed of one layer (A) and two layers (B), the layer (A) forming a central layer.

19. A biaxially oriented laminated film magnetic recording tape according to claim 16 wherein the magnetic layer comprises ferromagnetic particles in a vinyl acetate-vinyl chloride copolymer and polyurethane binder.

20. A magnetic recording disk comprising of a magnetic recording layer and a biaxially oriented laminated polyester base film wherein the base film comprises a layer (A) of a polyester consisting essentially of 2,6-naphthalenedicarboxylic acid and ethylene glycol components and a layer (B) of a copolyester consisting essentially of 2,6-naphthalenedicarboxylic acid, ethylene glycol and diethylene glycol components, the copolyester containing 1 to 2.0% by weight of the diethylene glycol, based on the weight of the layer (B) copolyester, the layer (A) being provided with the layer (B) on one surface or both surfaces of layer (A), the layer (B) having the thickness of 0.2 to 5 μm, wherein the laminated polyester film has a total thickness of 30 to 80 μm and Young's moduli of at least 500 kg/mm² in both the machine and transverse directions.

21. A magnetic recording disk according to claim 12, wherein the laminated polyester film has a bilayer structure formed of the layer (A) and the layer (B).

22. A magnetic recording disk according to claim 12, wherein the laminated polyester film has a three-layer structure formed of one layer (A) and two layers (B), the layer (A) forming a central layer.

23. A magnetic recording disk according to claim 20, wherein the magnetic layer comprises ferromagnetic particles in a vinyl acetate-vinyl chloride copolymer and polyurethane binder.

* * * * *